(12) United States Patent
Monberg et al.

(10) Patent No.: US 6,973,448 B1
(45) Date of Patent: Dec. 6, 2005

(54) METHOD AND SYSTEM FOR PROVIDING SERVICE LISTINGS IN ELECTRONIC YELLOW PAGES

(75) Inventors: James C. Monberg, Seattle, WA (US); Rico Mariani, Kirkland, WA (US); Gilma A. Z. Perkins, Redmond, WA (US); John G. Carey, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/651,406

(22) Filed: Aug. 30, 2000

(51) Int. Cl.[7] ............................................. G06F 17/30
(52) U.S. Cl. ................. 707/1; 707/3; 707/10; 709/217
(58) Field of Search ............................ 707/1, 3, 4, 10, 707/200; 705/26; 709/217

(56) References Cited

U.S. PATENT DOCUMENTS

| | | | |
|---|---|---|---|
| 5,930,474 A * | 7/1999 | Dunworth et al. | ............ 707/10 |
| 6,134,553 A * | 10/2000 | Jacobson et al. | ............. 707/10 |
| 6,148,260 A * | 11/2000 | Musk et al. | ................ 701/200 |
| 6,370,523 B1 * | 4/2002 | Anderson | ....................... 707/3 |
| 6,408,294 B1 * | 6/2002 | Getchius et al. | ............... 707/4 |
| 2002/0055878 A1 * | 5/2002 | Burton et al. | .................. 705/26 |

* cited by examiner

Primary Examiner—Charles Rones
Assistant Examiner—Hassan Mahmoudi
(74) Attorney, Agent, or Firm—Law Offices of Albert S. Michalik, PLLC

(57) ABSTRACT

A method and system for allowing a regional service merchant that is outside of a given geographical boundary, but services inside the geographical boundary, to be included in a result set of a search directed to a location inside the geographical boundary. Text and/or glyphs are returned along with the regional service merchant's business listing so as to explain to a user why a business not physically residing in the search area has been included in the result set. An application programming interface ensures that, if a business is listed as a regional service merchant, then the text and/or glyph is stored in association with the business listing.

28 Claims, 6 Drawing Sheets

| I.D. | BUSINESS NAME | ADDRESS | ZIP | CATEGORY |
|---|---|---|---|---|
| 00001 | PIZZA PRONTO | 111 2ND AVE. | 98199 | PIZZA DELIVERY |

| I.D. | BUSINESS NAME | ADDRESS | ZIP | CATEGORY |
|---|---|---|---|---|
| 00001 | PIZZA PRONTO | 111 2ND AVE. | 98199 | RESTAURANT |

| I.D. | BUSINESS NAME | ADDRESS | ZIP | CATEGORY | |
|---|---|---|---|---|---|
| 00001 | PIZZA PRONTO | 111 2ND AVE. | 98197 | PIZZA DELIVERY | RSM |
| 00001 | PIZZA PRONTO | 111 2ND AVE. | 98198 | PIZZA DELIVERY | RSM |
| 00001 | PIZZA PRONTO | 111 2ND AVE. | 98197 | RESTAURANT | RSM |
| 00001 | PIZZA PRONTO | 111 2ND AVE. | 98198 | RESTAURANT | RSM |

| I.D. | TEXT | GLYPH |
|---|---|---|
| 00001 | "DELIVERS TO THE AREA" | |

METHOD AND SYSTEM FOR PROVIDING SERVICE LISTINGS IN ELECTRONIC YELLOW PAGES

FIELD OF THE INVENTION

The present invention generally relates to Internet directories, and more specifically to a system for displaying merchants in an Internet yellow pages directory.

BACKGROUND OF THE INVENTION

Internet yellow pages are a useful tool for finding a particular entity, e.g., business, or finding a type of entity in a selected region. Some contemporary Internet yellow pages permit a user to direct a search to a particular region, such as a ZIP code defined region, a city, or a state (a "bounded query"). The results of the search identify a business or a particular number of businesses if the query is numerically limited, that have a physical presence (e.g., office) or a mailing address within that particular region.

Another search may be directed to businesses located closest to a particular proximity (a "proximity query"), for example all businesses within 10 miles of a selected location. A proximity query may be defined by a latitude and longitude on a map, and may be limited by a defined radius or number of listings, e.g., the ten closest businesses meeting the search criteria. A user may enter an address or ZIP code, and business listings are returned, usually listed in order of closest proximity to the entered location. If the user enters a ZIP code for the location search, a single address may be used for the ZIP code, such as a central location within the ZIP code, the location of the post office within the ZIP code, or a midpoint between multiple post offices.

One problem with these systems is that a merchant that services a particular area, but does not reside in that area, is not found in a bounded query directed to the area. In addition, the service merchant does not have a physical address in the area that can meet the criteria for returning a listing in response to a proximity query. For example, some mobile businesses (e.g., plumbers) service an area but do not have a physical office in the area. A bounded query directed to the area (e.g., directed to a particular ZIP code) does not return a listing for the mobile business. Likewise, a mobile business listing most likely is not returned in response to a proximity query, because there are likely other businesses that have a closer physical location than the business office for the mobile business. The listings for closer businesses are returned in response to the proximity query. In some circumstances, the closer businesses may not serve the location upon which the proximity query was based, but have their listings returned because their business offices or mailing addresses are closer than the business offices for some merchants that do serve the area.

As another example, a delivery business (e.g., pizza delivery) may deliver items or services to a region in which the business does not have a physical presence. Still another example is a regional or territorial business that may have one office per a given region (e.g., one office in a city), but may service a much larger area (e.g., the entire city). A final example is a business without any physical presence, such as an online business. The online business may only service particular regions, such as a grocery delivery service that only delivers to a particular city. None of these merchants would be found in a bounded-query search directed to the region unless the business office for the merchant was in the region, and would not be returned in response to a proximity query unless the business office happened to be located close enough to the location upon which the search was based.

SUMMARY OF THE INVENTION

The present invention provides a system for allowing merchants that are outside of a given geographical boundary, but service inside the geographical boundary, to be included in a result set of a bounded query directed to a location inside the geographical boundary. In addition, the system permits the merchant to be included in a result set for a proximity query, despite the merchant's place of business being located outside the boundaries of the proximity query. To this end, a schema is defined for a requesting merchant ("regional service merchants") that associates the regional service merchant with additional location bindings (e.g., ZIP codes) in which the regional service merchant provides services. For each business and each category to which a regional service merchant belongs, an entry is written to a database for associating each location binding that the business services with the regional service merchant.

In practice, to locate a business, a user requests a business listing by subject or name, and a particular geographical region, either via a bounded query or a proximity query. An Internet information server extracts location and category or name information from the search, and forwards a request to a SQL server for matches. For a bounded query (e.g., directed to one or more ZIP codes), the ZIP codes are retrieved for that region and used to query for merchants having categories and/or names that meet the search requirements. In this manner, a regional service merchant is included in a region search where one or more ZIP codes match. For a proximity search, listings for regional service merchants may be returned in response to a request made within a ZIP code that corresponds to the starting point of the proximity search. Since distance from the starting point is not a factor for regional service merchants, they may be added as desired to give meaningful results to the user (e.g., to the top of the list of result set).

To provide such an enhanced result set, regional service merchants are stored in a richer schema than ordinary businesses. This richer schema provides lines of text and/or a descriptive glyph or glyphs for each regional service merchant. The text and/or glyphs are returned along with the regional service merchant's business listing so as to explain to a user why a business that is not physically residing in the search area has been included in the result set. The text or glyph may indicate, for example, that a regional service merchant is mobile, territorial, or a delivery service. The text may also describe the business' service area. An application programming interface ensures that, if the business is listed as a regional service merchant, then the text and/or glyph is stored in association with the business listing.

Other advantages will become apparent from the following detailed description when taken in conjunction with the drawings, in which:

BRIEF DESCRIPTION OF THE DRAWINGS

FIGS. 3 and 4 are representations of data entries for a business in accordance with one aspect of the present invention;

FIG. 6 is a representation of four data entries for a business in accordance with one aspect of the present invention;

FIG. 7 is a representation of a data entry for maintaining regional service information for a business in accordance with another aspect of the present invention;

DETAILED DESCRIPTION

Exemplary Operating Environment

Figure 1:
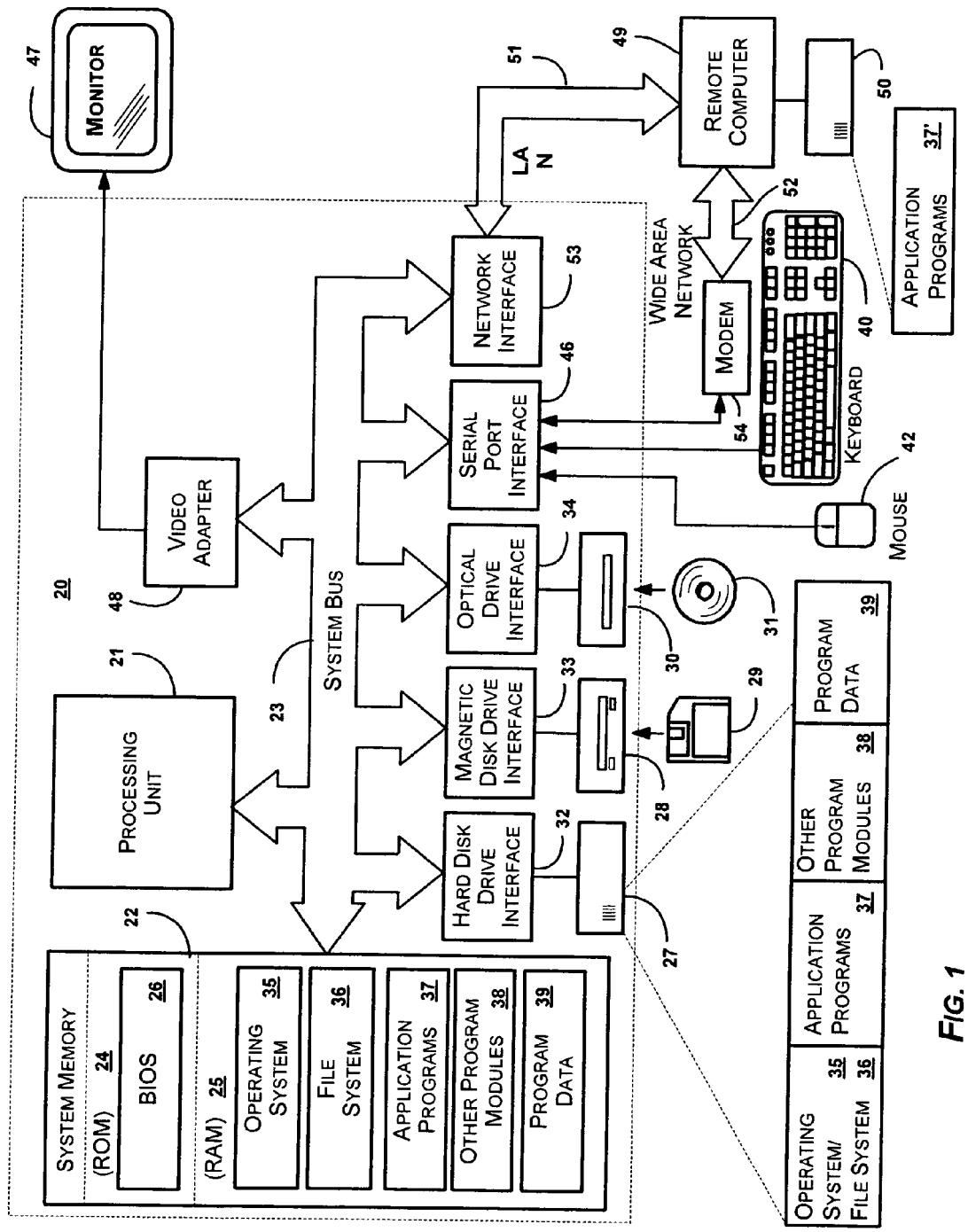
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, (including a file system 36 therein and/or associated therewith), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Providing Service Listings in Electronic Yellow Pages

Briefly described, the present invention provides a method and system for allowing merchants that are outside of a given geographical boundary, but provide service to the geographical boundary, to be included in a result set (e.g., of a bounded query) despite the merchant's actual physical location being located outside the geographical boundary. In addition, the system permits the merchant's listing to be included in a result set for a proximity query directed to a location in the area. To this end, the present invention provides additional location bindings (e.g., ZIP codes) in which the regional service merchant provides services, but in which the regional service merchant does not have a physical address. A binding is created between the regional service merchant and each business and each category to which the regional service merchant belongs.

Figure 2:
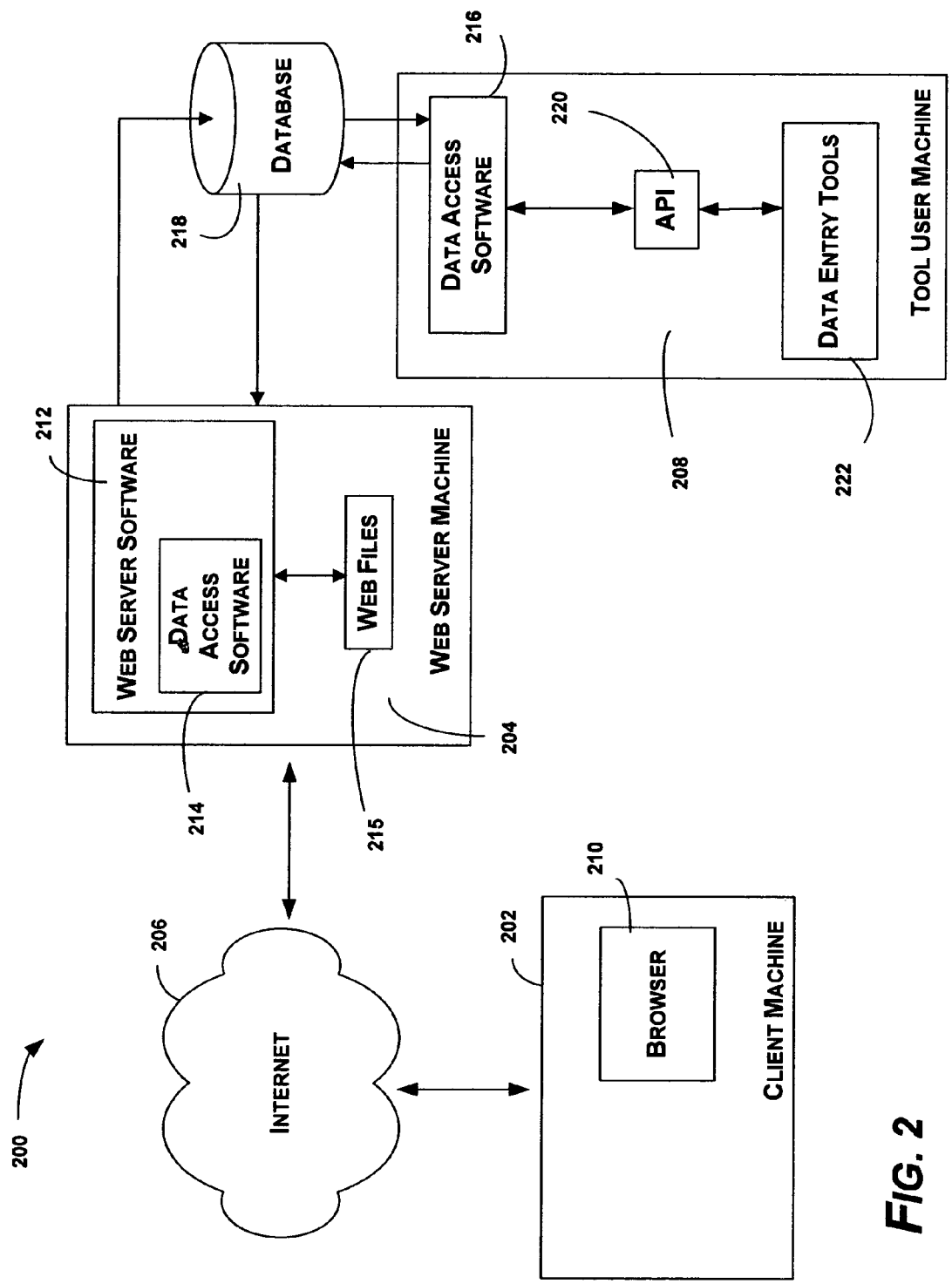
FIG. 2 is a functional block diagram that represents an illustrative system for providing regional service merchant listings for a search in accordance with one aspect of the present invention.

FIG. 2 is a functional block diagram that, together with the following discussion, provides a description of an illustrative system 200 for providing service listings in electronic yellow pages in accordance with the present invention. The system 200 includes a client machine 202 (e.g., the computer system 20) coupled to a web server machine 204 (e.g., the remote computer 49). The client machine 202 and the web server machine 204 may communicate with each other through the Internet 206. Alternatively, the client machine 202 and the web server machine 204 may be connected in another manner, such as through a Local Area Network described above. In addition, the functions of the client machine 202 and the web server machine may be provided on one physical machine.

A tool user machine 208 is similarly coupled to the web server machine 204, via the Internet 206, a Local Area Network, or the like. Alternatively, the functions of the web server machine 204 and the tool user machine 208 may be provided on one machine, or the functions of the client machine 202 and the web server and tool user machines 204, 208 may be provided on one machine or may be distributed over multiple machines.

The client machine 202 includes network access software, such as a browser 210. The web server machine 204 includes web server software 212 for accessing and serving content to the browser upon request. The web server software 212 may be, for example, Microsoft Corporation's Internet Information Server (IIS) software. As part of its features, the web server software 212 includes data access software 214. The data access software 214 includes database query software, such as structured query language (SQL) software, for example as is provided with Microsoft Corporation's SQL server software. The web server machine 204 also includes web files 215 that provide web pages for requesting yellow pages listings. The web server machine includes or is associated with at least one database 218.

The tool user machine 208 includes a special application programming interface (API) 220. As is described further below, the data entry tool set 222 accesses the database 218 via the API 220 and data access software 216. The API 220 exists to automatically enforce various business rules that are required to maintain the logical consistency of the data in the database. These rules include restrictions on the type and nature of regional service merchants (e.g., the regional service merchant must be exactly one of mobile, territorial, or delivery—they must have glyphs and/or text, and so forth).

The database 218 maintains a schema that includes at least one entry for each business listed with the yellow pages. The business information is grouped, referenced and categorized according to a defined taxonomy. For a typical business, the listing may include the category (e.g., "pizza delivery"), the location of the business (i.e., address), the ZIP code of the location, a unique identification for the business and the name of the business. An example of such a business entry 300 is shown in FIG. 3. For ease of explanation, a field descriptor bar is shown above the corresponding columns of the business entry 300. The field descriptor bar provides a textual field description for each of the associated columns in the business entry 300 and is not typically included in the business entry. For the entry shown in FIG. 3, a pizza delivery business is listed as being located at 111 2nd Ave., in the ZIP code 98199, with a name "Pizza Pronto", and an identification of "00001". The business may also be listed in other categories. For example, Pizza Pronto may also be listed under the category "restaurants". For each additional category, a separate entry 400, such as is shown in FIG. 4, is entered in the database for the business. An Internet yellow pages provider may choose to require a business to pay extra to have multiple category entries. The multiple entries permit the business to be found utilizing a number of different search criteria.

Figure 5:
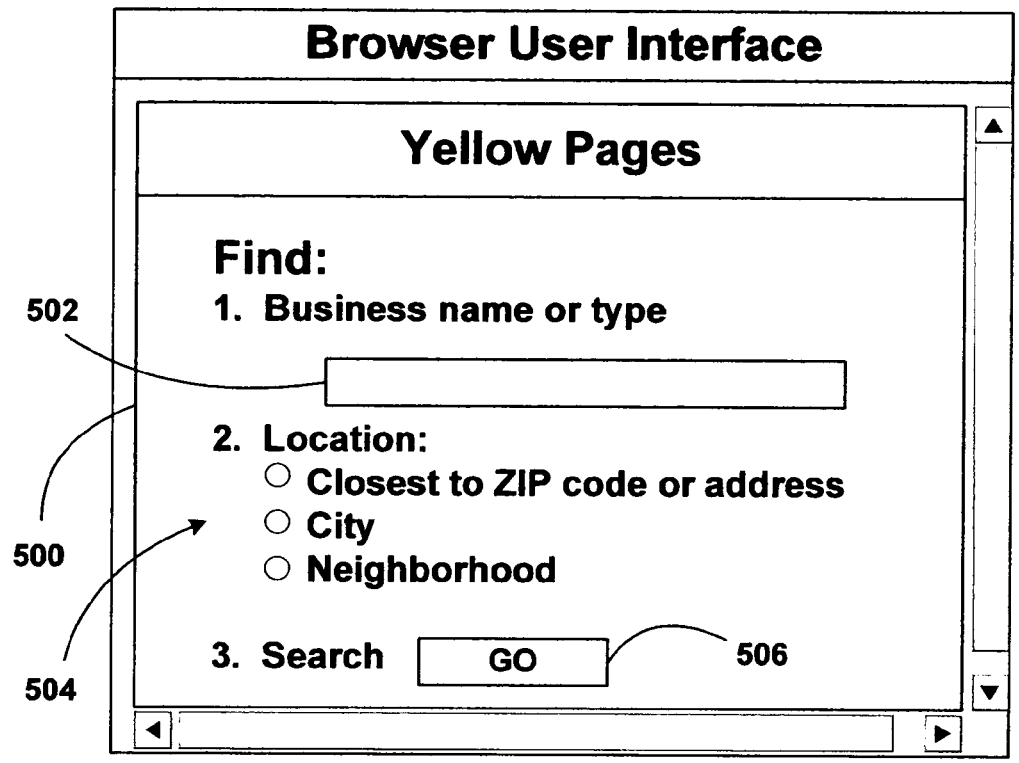
FIG. 5 is a representation of a search page for accessing yellow page information in accordance with one aspect of the present invention.

To locate a business, a user first navigates to a yellow page website, such as the web page 500 shown in FIG. 5. As one skilled in the art will appreciate, remote files such as the web page 500 may be accessed, such as via the File Transfer Protocol (FTP) via the Internet 206, or as a file copy over the optional Local Area Network, but preferably via the standard Hypertext Transfer Protocol (HTTP) which is now most prevalent on the Internet. To access a remote web file, a user may, for example, enter a uniform resource locator (URL) in the browser 210 on the client machine 202. In one example, the web page 500 is one of the web files 215 and is served to a user by the web server machine 202.

The web page 500 includes a data entry field 502 for entering search criteria, such as a category or business name. The user may request either a boundary query, such as by entering a ZIP code, city, or neighborhood, or a proximity query, by entering an address, ZIP code, coordinates, or the like. Fields 504 may be provided for selecting a particular type of search. Selecting a field may pop up a data entry field for entering the proper information, such as an address that is to be used in a proximity query. Alternatively, the user may be navigated to another page to enter the address or location information.

After the user enters the appropriate information, a search is requested (e.g., by clicking on a "GO" button 506). The data entered by the user is forwarded to the web server machine 202, and is received by the web server software 212. The data access software 214 removes the location information and extracts the appropriate business listings from the database 218.

It can be understood that the present invention is highly amenable to implementation on the web in a variety of configurations that are typical of existing business directories, and a database or any other data store may be utilized for business listing retrievals. To this end, retrieval can be accomplished via the most basic access to a computer file for small business sets or through something as complicated as an optimized SQL query for large business sets. An exemplary process that may be used by the data access software 214 to retrieve appropriate businesses and/or name information is described in U.S. application Ser. No. 09/629,275, filed Jul. 31, 2000, entitled "Business Directory Search Engine," and incorporated herein by reference. Briefly described, the data access software 214 matches the location and name or category information entered by a user with entries in the database to return a business listings result set. The data access software may need to convert address information to a longitude and latitude point, and may have to use an intelligent inquiry to obtain appropriate matches. The records are extracted by the data access software 214, forwarded to the web server machine, which in turn serves the records to the client machine 202 so that the records may be displayed by the browser 210.

As described in the background section, the entries described above do not permit a business that is servicing an area, but is not listed in the area (a "regional service merchant"), to be returned in the result set for a search directed to the area. Using the previous example, Pizza Pronto may deliver pizza to the ZIP codes 98197 and 98198, in addition to 98199. If only the listings above were available for the business, then a bounded query search directed to 98197 or 98198 would not return Pizza Pronto. In addition, a proximity search directed to a location in one of these ZIP codes would not return Pizza Pronto, unless 111 2nd Ave. is coincidentally close enough to the location to be in the result set for the search.

In accordance with one aspect of the invention, separate entries are provided for a regional service merchant that associate the regional service merchant with additional location bindings (e.g., ZIP codes) in which the regional service merchant provides services. For each business and each category to which a regional service merchant belongs, an entry is written to the database 218 for associating each location binding that the business services with the regional service merchant.

Again referencing the example above, separate entries are entered in the database 218 for each ZIP code and category to which Pizza Pronto belongs. FIG. 6 shows four additional entries 600 for Pizza Pronto that are used to indicate that the business services the 98197 and 98198 ZIP codes. Each entry additionally includes information that the entry is a regional service merchant entry ("RSM"). In the example shown, this information is an additional field filled with "RSM", but other information could be utilized, such as writing the entry to a separate database, or maintaining a separate data store that includes a list of all regional service merchant entries.

The regional service merchant entries permit regional service merchants to be returned in a search directed to the serviced region. For a bounded query (e.g., directed to one or more ZIP codes), the ZIP codes are retrieved for that region and queried against merchants and categories and/or names that meet the search requirements. Because the regional service merchant entries include ZIP code matches for regions serviced by the regional service merchant, the regional service merchant is included in a region search where one or more ZIP codes match. For a proximity search, regional service merchants may be returned against a request made for a location within a ZIP code in which the regional service merchants are registered.

In accordance with another aspect of the present invention, schema is maintained for the regional service merchants that includes lines of text and/or a glyph or glyphs. The text and/or a glyph may be maintained in a schema separate from the regional service merchant entries, or may be maintained as a separate entry and accessed via the SQL software, such as the data access software 214.

When a search is conducted, the text and/or glyphs are returned along with the regional service merchant's business listing so as to explain to a user why a business not physically residing in the search area has been included in the result set. The text or glyph may indicate, for example, that a regional service merchant is a mobile, a territorial, or a delivery service.

FIG. 7 shows an example of an entry 700 for the text and glyph schema maintained for the regional service merchant Pizza Pronto described in the above example. In this example, the text and glyph schema is maintained separate from the regional service merchant schema. The business ID is also maintained with the entry so that the text and glyph may be easily cross-referenced with the regional service merchant schema. In FIG. 7, both a text entry "delivers to the area" 702 and a glyph 704, in the shape of a bicycle, are maintained for Pizza Pronto. One or both may be returned with the result set, and the web server machine and/or the browser may choose to display one or both based upon the browser's capabilities and/or available web page space. The text may also be used as free text to describe the region serviced by the regional service merchant (e.g., "Serving the greater Seattle Metro area"). As is described in the background section, an RSM merchant may be an eCommerce merchant. The text and/or glyph may define the region serviced by the eCommerce merchant, and may convey the fact that the regional service merchant is an eCommerce business.

Entries in the database 218 may be entered or amended via the data entry tool set 222. The application programming interface 220 ensures that, if the business is listed as a regional service merchant, then text and/or glyph indicating that the business is a regional service merchant is stored in association with the business listing. This process ensures that text and/or a glyph is available so that the regional service merchant is properly portrayed as such to the user. To do this, the application programming interface 220 may, for example, ensure that information regarding the fact that the business is a regional service merchant is stored with the regional service merchant entries (e.g., the entry "RSM"), and that text and/or glyph is stored in association with a regional service merchant entry.

Figure 8:
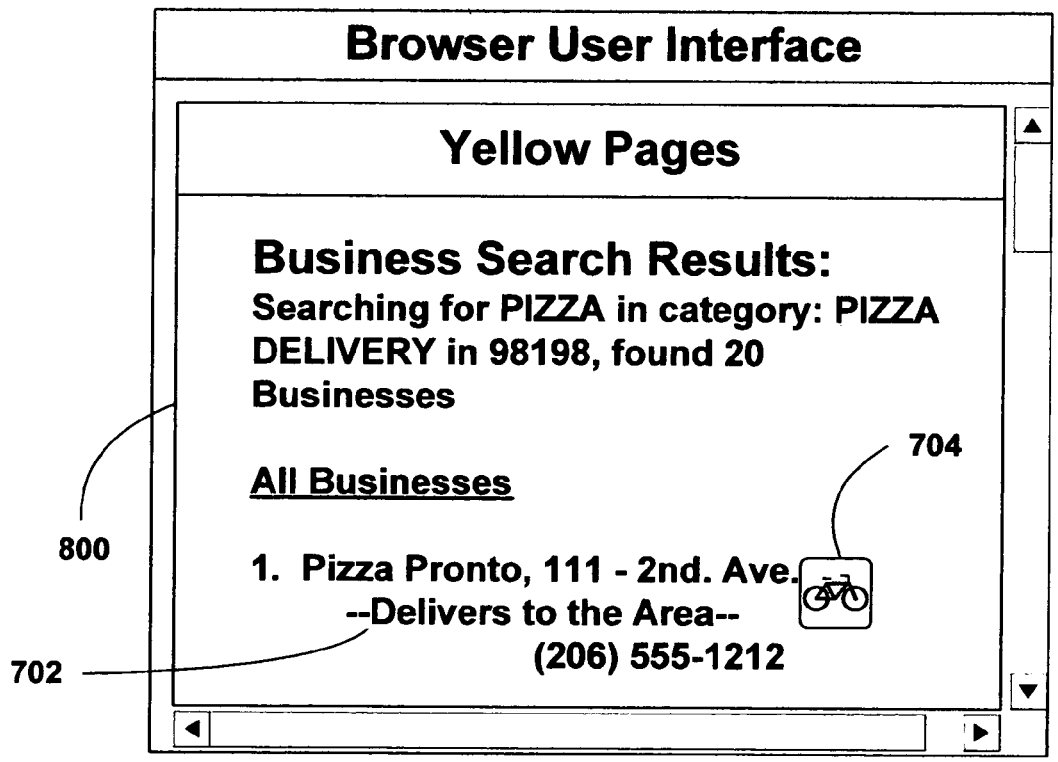
FIG. 8 is a representation of a web page showing the results of a yellow pages search in accordance with one aspect of the present invention.

FIG. 8 shows a web page 800 that displays the results of a search conducted via the search page 500. The search is directed to "pizza" and the ZIP code "98198". The data access software finds a closest match to pizza to be the category "pizza delivery", and returns merchants that are registered in that category and with the zip code 98198. The search returns, among other merchants, Pizza Pronto. In this example, regional service merchants are returned at the top of the list, but they could be listed alphabetically, in accordance with fees paid to the yellow pages provider, or in another desired order. The text 702 and glyph 704 are returned with the result set, and are displayed on the page along with the Pizza Pronto listing so that a user may know that the listing is that of a regional service merchant.

Figure 9:
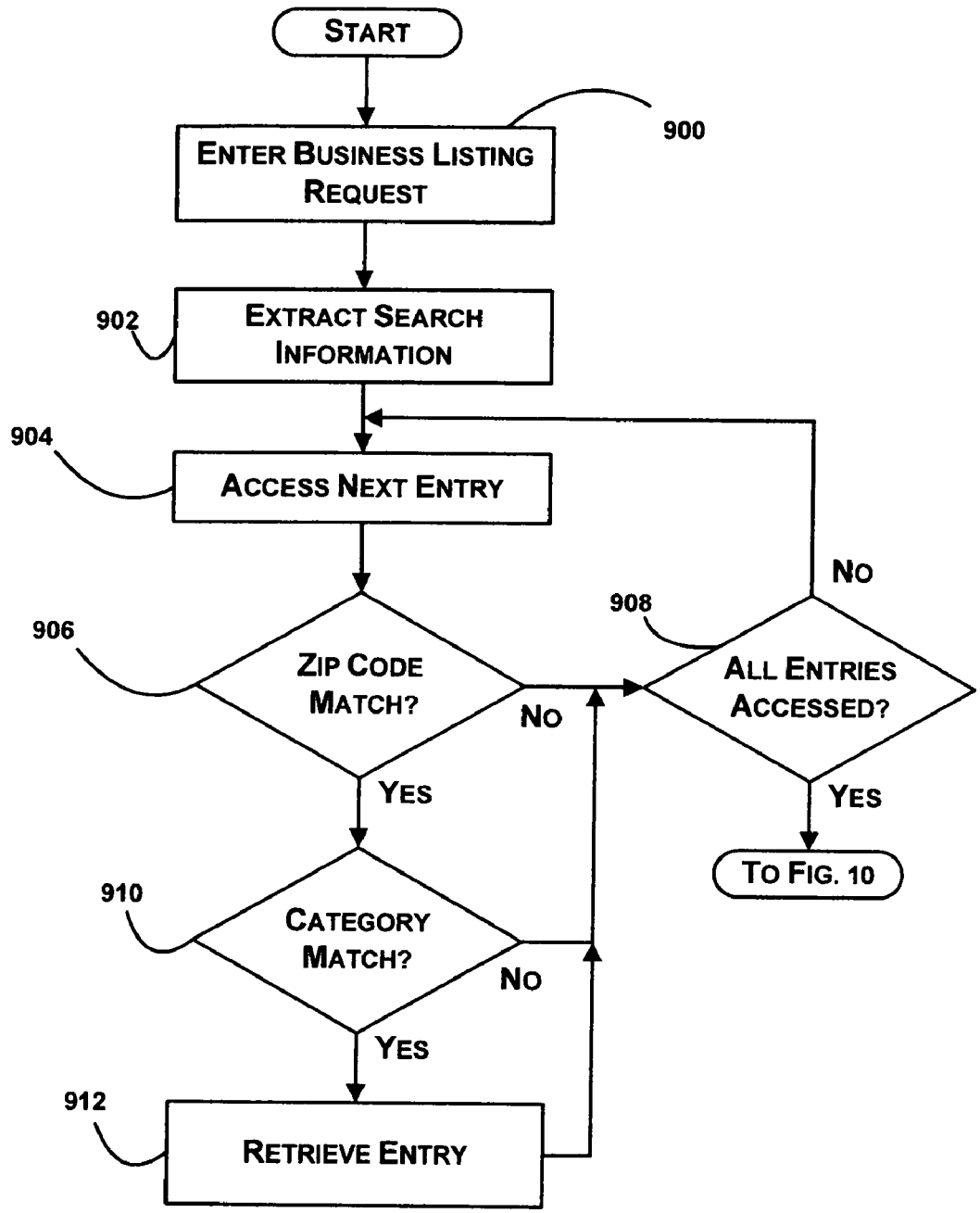
FIGS. 9 and 10 comprise a flow diagram generally representing steps for providing regional service merchant listings for a search in accordance with one aspect of the present invention.
Figure 10:
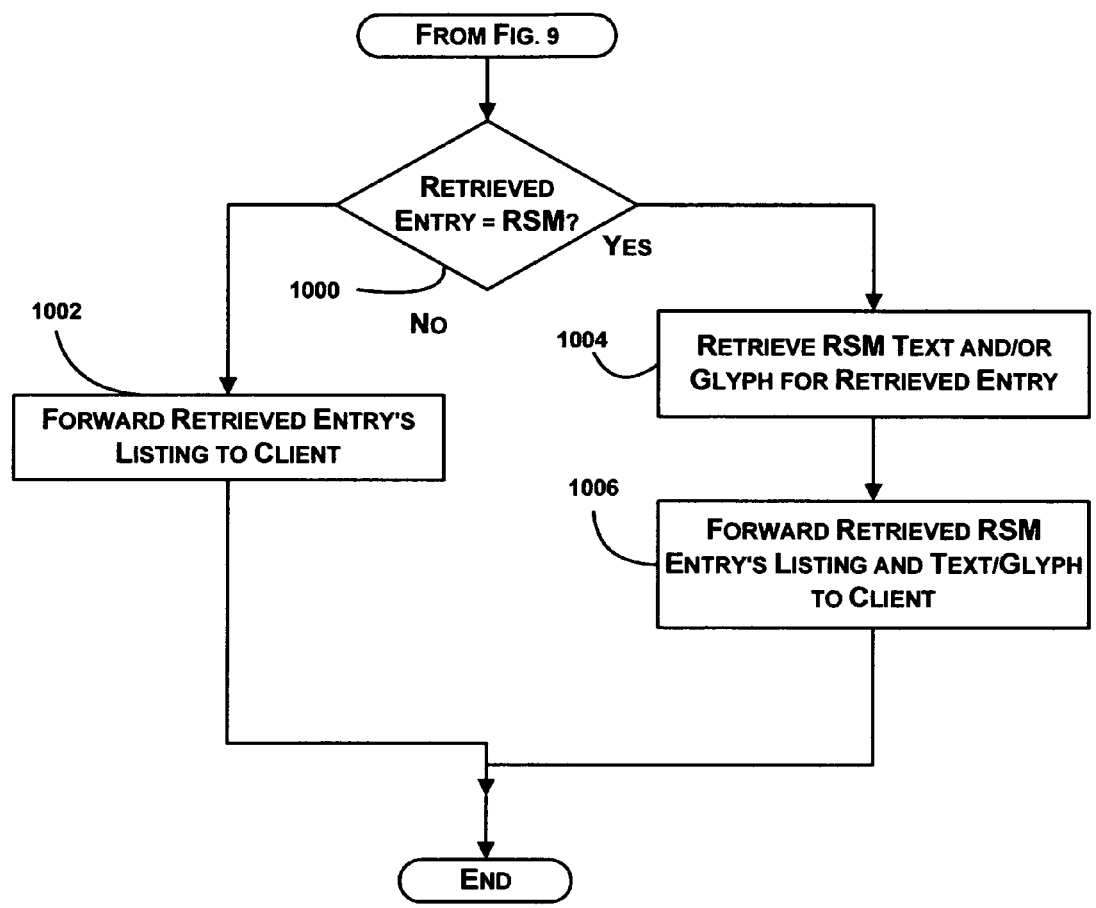

Turning now to an explanation of the operation of the present invention, FIGS. 9 and 10 show a general overview of a process for returning a regional service merchant in response to a search directed to a region in which the regional service merchant service does not have a physical address in accordance with one aspect of the present invention. Beginning at step 900, a user enters a request for business listings by selecting or inputting location and category information. The user may, for example, enter a category and a zip code via the yellow pages web page 300.

At step 902 the stored remote service merchant data about a business is retrieved. Retrieval can be accomplished via the most basic access to a computer file for small business sets or through something as complicated as an optimized SQL query for large business sets. The invention may be effectively practiced using any number of data stores.

At step 904, the data access software accesses an entry, and determines if it matches the entered ZIP code or codes (step 906). If not, then the data access software determines if all entries have been accessed (step 908). If not, then the process loops back to step 904 and the data access software accesses the next entry. This process continues until the data access software accesses a match for the ZIP code(s), where step 906 branches to step 910. The data access software then determines if the category of the entry having the correct zip code matches the category entered in the search, and if not, step 910 branches to step 908 where a determination is made whether all records have been accessed. If not, then the process loops back to step 904 and the data access software accesses the next record. This process continues until the data access software accesses a match for the ZIP code(s) and the category, where step 906 branches to step 910, and step 910 branches to step 912, where the entry matching both the ZIP code(s) and category information is retrieved. Step 912 then branches to step 908, where a determination is made whether all relevant entries have been accessed. If not, then the process loops back to step 904 where the next entry is accessed.

The foregoing steps describe a simplified approach to retrieving relevant entries. It can be understood that a more sophisticated logic may be used to speed up the process. For example, in a high performance implementation, steps 904 to 912 may be simultaneously executed in one omnibus query to an optimizing SQL access layer. Use of SQL in this fashion is commonplace and providing as much information about the desired result set as possible to the SQL optimizer generally results in the best performance.

In any event, after all entries have been accessed, then step 908 branches to FIG. 10, where at step 1000 a determination is made whether a retrieved entry is a regional service merchant. If not, then step 1000 branches to step 1002, where the retrieved entry's listing is forwarded to the client machine for viewing in the browser. If the entry is a regional service merchant, then step 1000 branches to step 1004, where the RSM glyph and/or text for the entry are retrieved. The regional service merchant entry and the RSM glyph and/or text are then served to the client machine at step 1006. In practice, the RSM entries and non-RSM entries may be sent to the client together, and sorting and other formatting parameters may be applied before the entries are sent.

The present invention is advantageous in that it permits a regional service merchant to be displayed in the result set for a search directed to an area, despite the regional service merchant not having a physical location in the area. In addition, the use of the text and/or glyph describes to the user why the regional service merchant is displayed so as to avoid confusion.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention. It is especially noteworthy that this invention is amenable to deployment on a variety of network topologies, and while the exemplary embodiment is described with reference to directory access happening over the Internet and tools use happening on a LAN-based client machine other topologies (such as the reverse of the exemplary embodiment, or either hybrid) are readily practicable.

What is claimed is:

1. A computer system comprising:
    a data store for maintaining location binding information for merchants that provide service to a region, at least one merchant having location binding information for a region in which that merchant does include a physical location and for a region in which the merchant does not include a physical location, wherein the at least one merchant does not provide service to all regions maintained in the location binding information;
    data entry tools for entering the information in the data store; and
    an application programming interface for ensuring that the information is stored with each merchant entered by the data entry tools; and
    means for searching the location binding information for merchants to locate at least one merchant that matches at least one requested region.

2. The system of claim 1 wherein the application programming interface includes rules that require each merchant in the data store to be identified as one of a mobile, territorial, or delivery type of merchant.

3. The system of claim 1 wherein the application programming interface includes rules that specify whether each merchant identified in the data store requires an associated glyph.

4. The system of claim 1 wherein the application programming interface includes rules that specify whether each merchant identified in the data store requires an associated text.

5. In a computer system, a method comprising:
    maintaining location binding information associating a merchant with a plurality of listed regions, including at least one listed region in which the merchant provides service and in which the merchant does not include a physical location and including at least one listed region in which the merchant provides service and does include a physical location wherein the at least one listed region that does not include a physical location is in close proximity to the listed region that does include the physical location;
    receiving a request for a merchant that does not service every region listed in the location binding information, the request directed to a particular region; and
    searching the location binding information associated with the merchant to determine if the particular region matches at least one of the listed regions, and if so, returning information regarding the merchant.

6. The method of claim 5, wherein maintaining the location binding information comprises writing an entry into a database including information about each listed region and information about the merchant.

7. The method of claim 5, further comprising returning additional information regarding the merchant.

8. The method of claim 7, wherein the additional information comprises text.

9. The method of claim 7, wherein the additional information comprises a glyph.

10. The method of claim 5, wherein the plurality of listed regions comprises at least one ZIP code.

11. A computer-readable medium having computer-executable instructions for performing the method of claim 5.

12. A method in a computer system, comprising:
    submitting a search query directed to businesses, the search query including a designation of a region;
    receiving a business listing in response to the search query, the business listing generated via a search of location binding information that represents a region in which at least one merchant provides service and in which each merchant does not include a physical location, and being associated with a merchant that provides service to a plurality of regions that are in close proximity to the region queried, but not all regions in close proximity, and wherein the queried region is a region in which the merchant services but does not have a physical location in the queried region; and receiving, along with the business listing, information regarding the fact that the merchant services the queried region but does not have a physical location in the queried region.

13. The method of claim 12, further comprising displaying the information along with the business listing.

14. The method of claim 12, wherein the information comprises text.

15. The method of claim 12, wherein the information comprises text and a glyph.

16. The method of claim 12, wherein the information comprises a glyph.

17. A computer-readable medium having computer-executable instructions for performing the method of claim 12.

18. In a computer system, a method comprising:

receiving a request for a merchant within a particular region;

maintaining location binding information that associates a merchant outside the particular region with the particular region;

searching a database containing information associated with merchants located within the region and outside the region, including searching the location binding information;

returning information regarding the merchants within the region that service the region; and returning information regarding merchants outside the region that service the region but not at least one other area outside the region, the information regarding merchants outside the region indicating that the merchant provides service to the region but does not have a physical location in the region and that the merchant does not provide service to other areas outside the region.

19. The method of claim 18 wherein maintaining location binding information comprises writing an entry into a database including information about the particular region and information about the merchant.

20. The method of claim 18 further comprising returning a glyph associated with the information regarding each merchant outside the region.

21. A computer-readable medium having stored thereon a data structure, comprising:

a first data field containing data representing information about a merchant;

a second data field associated with the first data field and containing location binding data representing a region in which the merchant provides service and in which the merchant does not include a physical location; and a third data field associated with the first data field and containing location binding data representing a region in which the merchant provides service and in which the merchant does include a physical location;

such that a search request for a merchant that does not service every region, wherein the request seeking a merchant that services a particular region is compared to the second data field to determine from the location binding data therein whether the merchant represented in the first data field services that particular region, and if so, at least some of the information about the merchant contained in the first data field may be returned in response to the search request.

22. The data structure of claim 21, further comprising a fourth data field, associated with the first data field, and including additional information regarding the merchant.

23. The data structure of claim 22, wherein the fourth data field comprises text that indicates that the merchant provides service to the region but does not have a physical location in the region.

24. The data structure of claim 22, wherein the fourth data field comprises a glyph that indicates that the merchant provides service to the region but does not have a physical location in the region.

25. A computer-readable medium having stored thereon a data structure, comprising:

a first data field containing data representing information about a merchant;

a second data field associated with the first data field and containing data representing information regarding the merchant providing service to a region but not having a physical location in the region;

a third data field associated with the first data field and containing location binding data representing a region in which the merchant provides service and in which the merchant does not include a physical location; and a fourth data field associated with the first data field and containing location binding data representing a region in which the merchant provides service and in which the merchant does include a physical location;

such that a search request for a merchant that does not service every region, wherein the request seeking a merchant that services a particular region is compared to the third data field to determine from the location binding data therein whether the merchant represented in the first data field services that particular region, and if so, at least some of the information about the merchant contained in the second data field may be returned in response to the search request.

26. The data structure of claim 25, wherein the second data field comprises text that indicates that the merchant provides service to the region but does not have a physical location in the region.

27. The data structure of claim 25, wherein the second data field comprises a glyph that indicates that the merchant provides service to the region but does not have a physical location in the region.

28. A computer-readable medium having computer-executable instructions for performing the method of claim 18.

\* \* \* \* \*